Nov. 23, 1965 P. DAVIDSON Re. 25,915

HOT TOP CASING FOR CASTING MOLDS

Original Filed Dec. 21, 1959

Per Davidson

INVENTOR.

BY:

Pierce, Scheffler & Parker

ATTORNEYS.

United States Patent Office

Re. 25,915
Reissued Nov. 23, 1965

25,915

HOT TOP CASING FOR CASTING MOLDS

Per Davidson, Sandviken, Sweden, assignor to Sandvikens Jernverks, Aktiebolag, Sandviken, Sweden, a Swedish corporation Original No. 3,072,981, dated Jan. 15, 1963, Ser. No. 861,098, Dec. 21, 1959. Application for reissue Jan. 5, 1965, Ser. No. 438,446
Claims priority, application Sweden, Dec. 23, 1958, 11,934
8 Claims. (Cl. 249—197)

Matter enclosed in heavy brackets [ ] appears in the original patent but forms no part of this reissue specification; matter printed in italics indicates the additions made by reissue.

This invention relates generally to casting molds used in the casting of steel and other metals and more particularly to a hot top casing structure adapted for use with ingot casting molds.

For a long time there has been a need in the casting hot top art for a mold casing material which meets the requirements of good heat insulation, good form resistance and low manufacturing cost. While various types of hot top casings have been provided in the past, these have been specifically designed to provide roughened sinkhead surfaces on the cast ingot so that the ingot may be suitably gripped by the tongs of lifting cranes.

An object of the present invention is to provide a casting mold hot top casing of simple construction which produces an ingot the sinkhead of which has smooth surfaces so that the sinkhead part of the ingot may be used during subsequent ingot treatment rather than being wasted as in the past.

Another object of the invention is to provide a hot top which results in orientation of the arising pipes and liquations extending upwardly in the ingot so that the portion of the ingot being returned as scrap during subsequent ingot treatment is minimized.

According to the present invention it is possible to manufacture, at low cost, casting mold hot tops having superior qualities. In accordance with the invention the hot top includes a firm and relatively thin casing consisting of an organic fibrous material, a fireproof material, and a binder, which casing is characterized in that it consists by weight of not less than 2% and not more than 20% (preferably not more than 15%) organic fibrous material, 4–10% binder, and the remainder fireproof material. For the organic fibrous material it has been proven advantageous to use paper pulp, waste paper or the like—e.g., mechanical pulp or a pulp of waste paper or the like possibly with an addition of chemical pulp. As fireproof material may be used quartz, sand or another silicate; in some cases basic materials as burned dolomite, cinders, or the like may be used. In the fireproof material may also be included up to 10% by weight of a fireproof fibrous material such as asbestos. The binding medium may be organic or inorganic. Of the first type there may be mentioned glue, such as synthetic glue (e.g., synthetic resins or silicone resin), glue manufactured from animal or vegetable raw materials (cellulose glue). Of the latter type may be mentioned fireproof cement or silicate of potassium (water glass). The casing may be completely or partly surrounded by an insulated volume of air or by a heat insulating material such as sand, bricks or the like.

It has been shown that hot top casings in accordance with the invention are relatively inexpensive to manufacture, have good storing and form resistance properties, good insulation qualities, and achieve smooth surfaces of the cast metal. For example, during the manufacture of a steel ingot with the use of hot top casings in accordance with the invention the sinkhead obtains a smooth surface as the pipes or liquations are concentrated in its uppermost part. This is of great economical importance, since only a very small part of the steel in a sinkhead has to be returned as scrap.

Other objects and advantages of my invention will become apparent from a study of the following specification when considered in conjunction with the accompanying drawings in which.

Figure 3:
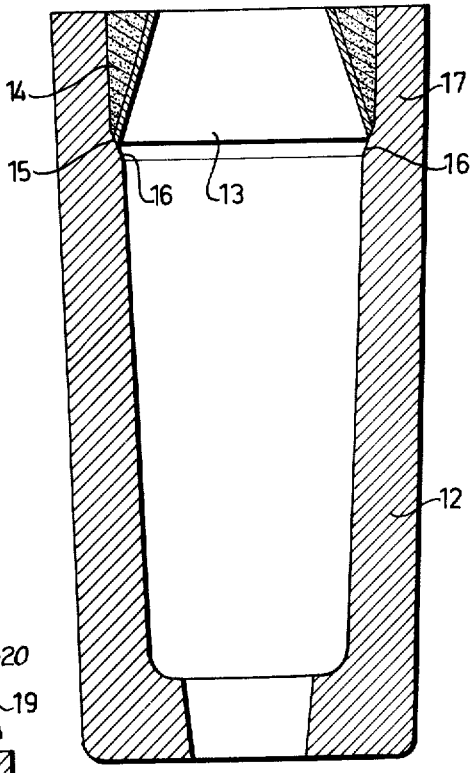
FIG. 3 is a sectional view taken through the mold and hot top.
Figure 4:
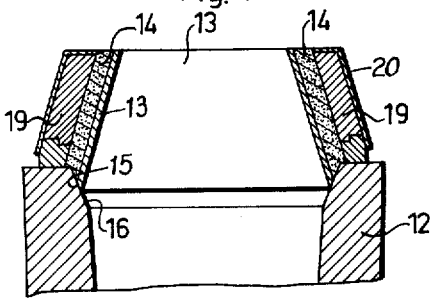
FIG. 4 is a detailed sectional view of another embodiment of the invention.
Figure 5:
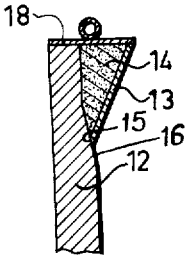
FIGS. 5–7 are detailed sectional views of other hot top constructions.
Figure 6:
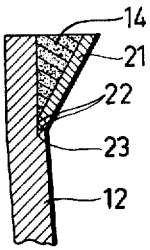

As shown in FIGS. 3–5, the hot top casing 13 tapers upwardly and inwardly and is supported at its lower edge on the shoulder portions 16 of the wall of the ingot mold 12. It is also possible, however, to place the hot top casing upon the upper circumferential surface of the ingot mold opening. As mentioned above the casing consists by weight of 2–20% (preferably 2–15%) organic fibrous material, 4–10% binder, and the remainder fireproof material. As especially preferred limits there may be mentioned 2.5–13% by weight organic fibrous material and 4.5–9% binder. Possibly also smaller quantities of other materials may be included. As examples of organic fibrous materials of suitable consistency may be mentioned paper pulp, waste paper or the like (e.g. mechanical pulp or pulp manufactured from waste paper, possibly having an addition of chemical pulp). The suitability of the mentioned fiber pulp for this purpose is that the binding of the usually granular and/or powder-formed fireproof material (e.g. quartz) is facilitated, and also the casing is given a porosity which substantially increases its insulation qualities. It has also been shown that injurious gas formation is avoided by the use of the casing when the above mentioned contents of the fibrous material are included.

As fireproof material, quartz or quartzite may be suitably used. Also other fireproof materials such as sand, certain other silicates, basic materials as burned dolomite and cinders and the like may be used. If desired one may use up to about 10% (preferably 0–4%) by weight fireproof fiber material (as for example asbestos) mixed in the usually granular and/or powder-formed fireproof material. The [medium] *average* grain size for the fireproof material is to be below 1 mm., preferably below 0.3 mm. and often below 0.2 mm. Suitable limits for the [medium] *average* grain size may be 0.6–0.05 mm. The grain size may be stated as being below [100] *45* mesh, preferably below [45] *100* mesh.

The binder in the casing may be glue, such as synthetic glue, e.g. synthetic resin or silicone resin, or glue manufactured of animal or vegetable raw materials such as cellulose glue. Usually a sufficient quantity of binder is added to achieve satisfactory strength. In certain cases instead of the above mentioned binder an inorganic binder such as fireproof cement or water-glass may be used.

As examples of suitable material compositions for the casing in accordance with the invention may be mentioned the following:

(1) Mass or pulp composed [by] *of* waste paper and/or other mechanical pulp, possibly mixed with some smaller quantities of chemical pulp, total 2–12% by weight, synthetic resin, glue or the like, 5–8% by weight, and the remainder fireproof material, preferably quartzite powder and/or the like.

(2) Paper pulp and/or waste paper, 2–8% by weight, glue 5–8% and the rest consisting of fireproof material.

(3) Paper pulp 3–12% by weight (preferably about 3%), asbestos 0.4% (preferably above 0%), glue 5–8% and the rest fireproof material.

Figure 1:
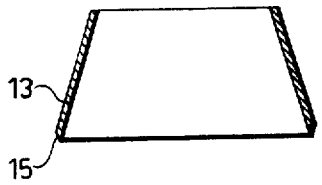
FIG. 1 is a vertical section of the hot top casing taken along line 1—1 of FIG. 2.
Figure 2:
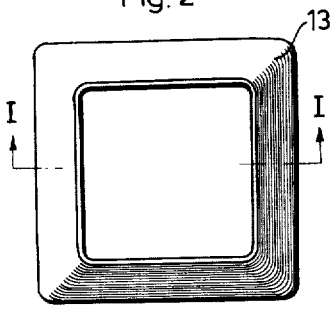
FIG. 2 is a plan view of the hot top casing.

As shown in FIGS. 1–2, the hot top casing 13 is formed with a lower terminal surface 15 which contacts the shoulder surface 16 of the inner wall of the ingot mold 12 (FIG. 3).

The shoulder surface 16 is inclined to the vertical at an angle of 2–15°, preferably 2–10°. For small diameter variations between the ingot molds of the same type and size the casing will be applied in such a way upon the ingot mold that the total volume included in the casing and ingot mold (and thus the ingot weight) will be substantially constant.

In the embodiment of FIG. 3, the inner wall portions of the ingot mold below and above the shoulder portion 16 may be formed with surfaces slightly inclined to the vertical and also to the surface of shoulder portion 16. The space 14 between casing 13 and upper part 17 of the ingot mold is filled with sand, bricks or another insulating material. It is naturally also possible to effect mold insulation by enclosing air in a suitable manner in the space 14. Before or after the application of the casing it may be desirable to apply a sealing medium, such as asbestos, putty, wood wool, straw, glass wool or the like on or close to the contact surface of the ingot mold and the casing 13 as at 15, 16.

In FIG. 4 is shown an embodiment in which the ingot mold 12 terminates at its upper end adjacent the shoulder portion 16. Above the ingot mold is placed an outer casing 19 of an insulating material, such as insulating bricks, surrounded by an outer shell 20, and this outer casing 19 laterally supports the outer surface of the hot top casing. Between the outer casing 19 and the hot top casing 13 is arranged a space 14.

Other modifications of the hot top casing are possible, of course. The outer surface of the hot top casing may be supported by an outer casing and its lower edge may extend into the upper portion of the ingot mold. In FIG. 5 is shown a hot top, corresponding with that of FIG. 3, at the upper portion of which is provided a cover 18 above the space 14 which space is filled with insulating material, such as bricks.

Figure 7:
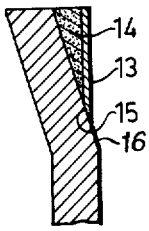

The hot top casing 13 has been illustrated in FIGS. 1–6 as tapering upwardly and inwardly toward the center of the ingot mold, but the casing may also have substantially vertical walls as illustrated in FIG. 7.

A hot top casing formed in accordance with FIGS. 1–5 and 7 with or without the last mentioned cover provides the great advantage that steel or the like from the bloom does not to any substantial degree penetrate between the casing and the inner wall of the ingot mold, on account of which the risk of hot cracks in the outer layer of the ingot in connection with the stiffening of the ingot is avoided. Further there is obtained a smooth travel between hot top and ingot mold and in the ingot the formation of pads or any other protuberances is avoided, which flaws ordinarily would have been impossible to remove during rolling; consequently, the percentage of scrap in the ingot is materially reduced.

In the embodiments described above with reference to

FIGS. 1–5 and 7, the lower extremity 15 of the casing 13 is tapered and the outer surface of the tapered portion converges inwardly toward the inner surface. For certain types of ingot molds (FIG. 6) the extremity of the lower surface of the casing 21 may terminate in two angularly inclined surfaces 22 joined by a common edge 23, which surfaces are contiguous with the walls of a corresponding ledge in the inner wall of the mold.

The thickness of the casing (13, 21) above the lower end supporting surface or surfaces (15, 22) is generally constant and preferably between 5 and 15 mm. For a 1.7-ton ingot the casing thickness should be approximately 12 mm.

While in accordance with the patent statutes I have illustrated and described the best forms and embodiments of my invention now known to me, it will be apparent to those skilled in the art that other changes may be made in the apparatus described without deviating from the invention as set forth in the following claims.

I claim:

1. A hot top casing for an ingot casting mold consisting of a molded mixture of from 2 to 15% by weight of a fibrous organic material, 4 to 10% by weight of a binder, up to 4% by weight of an inorganic fibrous material and the remainder consisting essentially of a granular fireproof material which is not disintegrated by the heat to which it is subjected in use selected from the group consisting of quartz, sand, refractory silicates, burned dolomite and cinders, said granular fireproof material having [a medium] *an average* grain size within the range from 0.6 to 0.05 mm. and said casing being relatively thin and having a smooth inner surface.

2. A hot top casing as defined in claim 1 wherein said binder is an organic glue.

3. A hot top casing as defined in claim 1 wherein said fireproof material is quartz.

4. A hot top casing as defined in claim 1 wherein said organic fibrous material includes cellulosic fibers less than 8% by weight, and said binder includes glue in the range of 4–8%.

5. A hot top casing as defined in claim 1 in which the percentage of fibrous organic material is within the range from 2.5% to 13%.

6. A hot top casing for an ingot casting mold consisting of a molded mixture of from 2 to 15% by weight of a cellulose fibrous organic material, 4 to 10% by weight of a resin binder, up to 4% by weight of an inorganic fibrous material and the remainder consisting essentially of a granular fireproof material which is not disintegrated by the heat to which it is subjected in use consisting of refractory silicate containing material, said granular fireproof material having [a medium] *an average* grain size within the range from 0.6 to 0.05 mm. and said casing being relatively thin and having a smooth inner surface.

*7. A hot top casing for an ingot casting mold consisting of a molded mixture of from 2 to 15% by weight of a fibrous organic material, 4 to 10% by weight of a binder, up to 4% by weight of an inorganic fibrous material and the remainder consisting essentially of a granular fireproof material which is not disintegrated by the heat to which it is subjected in use selected from the group consisting of quartz, sand, refractory silicates, burned dolomite and cinders, said granular fireproof material having an average grain size below about one mm. and said casing being relatively thin and having a smooth inner surface.*

*8. A hot top casing for an ingot casting mold consisting of a molded mixture of from 2 to 15% by weight of a fibrous organic material, 4 to 10% by weight of a binder, up to 4% by weight of an inorganic fibrous material and the remainder consisting essentially of a finely divided fireproof material which is not disintegrated by the heat to which it is subjected in use selected from the group consisting of quartz, sand, refractory silicates, burned*

*dolomite and cinders, said casing being relatively thin and having a smooth inner surface.*

References Cited by the Examiner

The following references, cited by the Examiner, are of record in the patented file of this patent or the original patent.

UNITED STATES PATENTS

| | | | |
|---|---|---|---|
| 1,674,232 | 6/1928 | Todd | 106—38.35 |
| 1,696,986 | 1/1929 | Trembour | 22—147 |
| 1,795,011 | 3/1931 | Cross | 106—38.35 |

| | | | |
|---|---|---|---|
| 1,819,364 | 8/1931 | Firth | 22—147 |
| 2,148,583 | 2/1939 | Rowe | 22—147 |
| 2,231,813 | 2/1941 | McDonald | 22—147 |
| 2,272,018 | 2/1942 | Nicholas | 22—147 |
| 2,361,386 | 10/1944 | Eayrs | 22—193 |
| 2,462,255 | 2/1949 | Charman et al. | 22—147 |
| 2,678,481 | 5/1954 | Peterson | 22—147 |
| 2,952,055 | 9/1960 | Gottschalk | 22—147 |

MARCUS U. LYONS, *Primary Examiner.*